Patented May 7, 1946

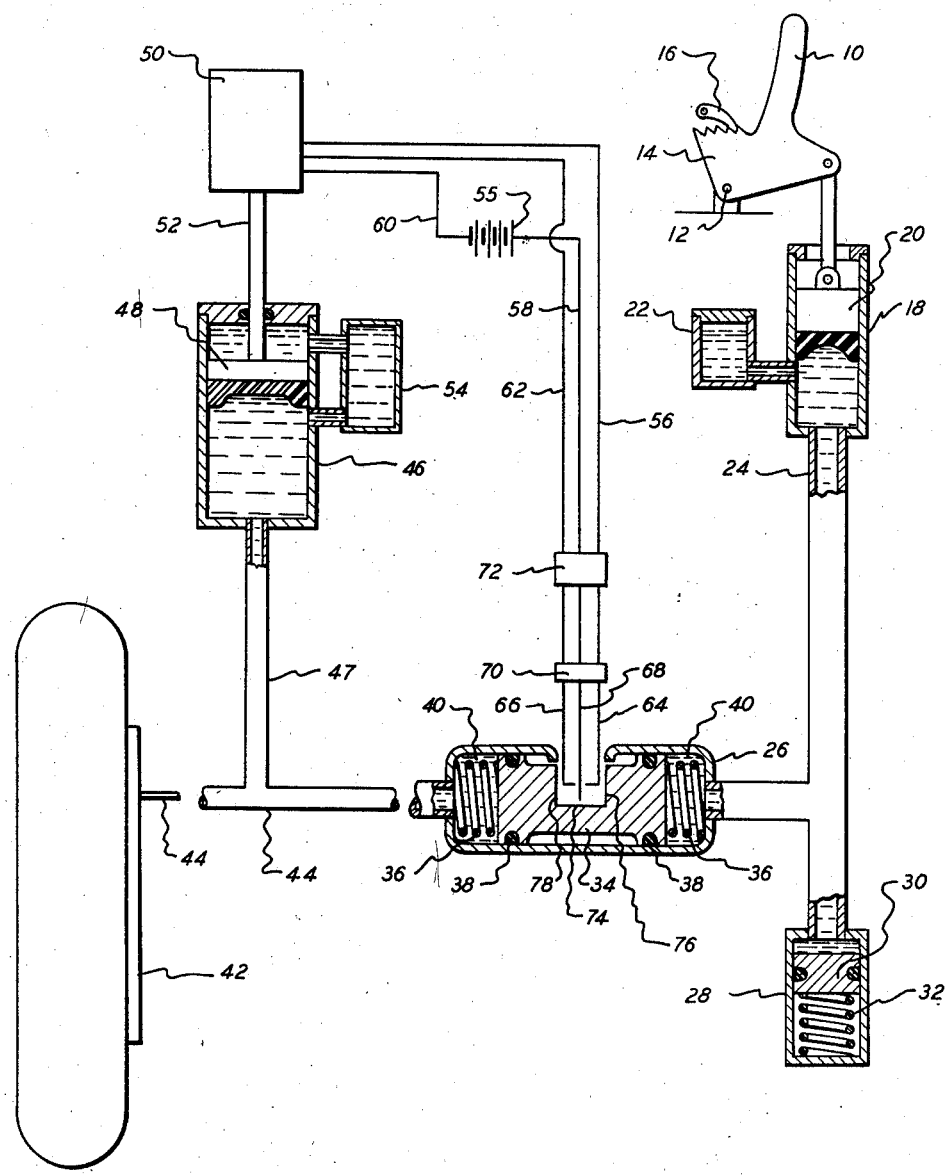

2,399,868

UNITED STATES PATENT OFFICE 2,399,868

BRAKE SYSTEM

Charles Hollerith, Jackson, Mich., assignor to Hayes Industries, Inc., Jackson, Mich., a corporation of Michigan Application March 17, 1944, Serial No. 526,869

4 Claims. (Cl. 188—152)

The present invention relates to an electro-hydraulic brake system.

One of the objects of the invention is to provide a brake system in which a fluid actuated control member controls an electrical circuit which applies the brake.

Another object of the invention is to provide an improved brake system in which an electrical circuit including a pressure developing means is remotely controlled through a hydraulic circuit through which the "feel" of the applied brakes is transmitted to the brake pedals.

Another object is to provide a brake system for aircraft in which the brakes are applied through hydraulic pressure developed by an electric motor, there being a control for the electric motor including the hydraulic line extending between the brakes and the foot pedal.

These and other objects residing in the arrangement, combination and construction of the parts constituting applicant's fluid brake system will more fully appear in the following specification and annexed claims.

In the drawing, applicant has diagrammatically illustrated his invention as applied to an aircraft.

The brake pedal 10 is pivoted at 12 and has a ratchet 14 with which the parking dog 16 is selectively engageable. The master cylinder is indicated at 18 in which the piston 20 connected to the brake lever 10 operates. The hydraulic control system is supplied with fluid through the reservoir 22. The fluid displaced from the cylinder 18 is directed through a conduit 24 into the control 26. Preferably the conduit 24 is of relatively small cross section, and to give sufficient pedal travel to the brake pedals, a large chamber 28 is provided having a piston 30 which reacts against its spring 32. At the time the pedal 10 is pivoted counterclockwise, as viewed in the drawing, the piston 30 will be displaced and tension built up in the spring 32.

The control 26 may be remotely located with reference to the cylinder or directly adjacent thereto as may be desired. In some installations it may be desirable to locate the control 26 directly on the landing gear or other structure closely associated with the wheel brakes. As shown, control 26 has a piston 34 floated between springs 36. Sealing rings 38 seal the fluid in the chambers 40 in the opposite ends of the pistons 34. The hydraulic brake 42 is connected with the chambers 40 through a conduit 44 and to the cylinder 46 through the conduit 47. Located within the brake master cylinder 46 is a piston 48 connected to a linear actuator motor 50 through the rod 52. The motor 50 may be of any suitable construction and is of a reversible type so that the piston 48 can be raised and lowered in the brake master cylinder 46. The reservoir 54 keeps the hydraulic system in which the cylinder 46 is located filled with fluid. The electrical circuit in which the linear actuator motor 50 is located consists of a battery 55, conductors 56, 58, 60 and 62. Contacts 64, 66 and 68 are supported from a suitable holder 70 and are electrically connected to a suitable relay 72 which connects and operates the motor 50 through the conductors 56, 58, 60 and 62.

The piston 34 is shown with a recess 74 providing shoulders 76 and 78. By constructing the contacts 64, 66 and 68 of resilient material, movement of the piston 34 in one direction will result in engagement between the shoulder 76 and the contact 64 and the moving of the contact 64 into engagement with the contact 68 to close an electrical circuit extending to the motor 50 to operate the same in a direction causing the piston 48 to move downwardly to apply the brakes 42. Movement of the piston 34 in the opposite direction will result in engagement between the shoulder 78 and the contact 66 with the result that the contact 66 is moved into engagement with the contact 68 to close another electrical circuit which will result in the motor 50 being driven in the opposite direction to raise the piston 48 and release the brakes. In the drawing shown, the piston 34 is in neutral position.

The operation of the brake system heretofore described is as follows: Displacement of fluid from the master cylinder 18 through application of force on the brake pedal 10 will lower the piston 30 compressing the spring 32. At the same time pressure against the piston 34 will move the same to the left from the position shown moving the wall 76 into engagement with the contact 64 to complete the electrical circuit through engagement with the contact 68. This completes the electrical circuit through the relay 72 to drive the electrical motor of the linear actuator unit 50 to advance the piston 48 of the brake master cylinder 46. Such advancement of the piston 48 builds up the pressure in the conduits 44 and 43. This increased fluid pressure operates to actuate the brakes 42. The pressure in applying the brakes reacts against the left-hand end of the piston 34 and is transmitted back through the conduit 24 against the foot pedal to give the operator of the brake lever so-called "feel" of the brake application. As the advancement of the piston 48 continues, the pressure built up in the chamber 40 at the left-hand end of the piston 34 will tend to move the piston 34 into a neutral position in which contacts 64 and 68 are out of engagement with one another. The operator of the brake pedal may hold piston 34 in its neutral position if he so desires by continuing to apply pressure to the brake pedal. Should he desire to release the brake, however, by letting up on the brake pedal 10, the retracting mechanism of usual construction in the brakes 42 will cause the piston 34 to be moved to the right as viewed in the drawing, bringing the shoulder 78 into engagement with the contact 66 and moving the same into engagement with the contact 68 to close the reversing circuit of the unit 50 to withdraw the piston 48. As the piston 48 is withdrawn to inactive position and the brake retracting means have performed the function of retracting the brakes, the spring 36 in the right-hand chamber 40 will move the piston 34 into the neutral position shown in the drawing opening both of the circuits to the motor piston.

Having thus described my invention, what I desire to secure by Letters Patent and claim is:

1. An electro-hydraulic brake system comprising a brake, a brake master cylinder, electromotive means for displacing hydraulic fluid in said brake master cylinder to apply said brake, said means including a brake applying circuit and a brake releasing circuit, switch mechanism in said circuit having a normally open position, a manual brake pedal, a manually actuated master cylinder operted by said pedal, a control cylinder, hydraulic connections between opposite ends of said control cylinder and said brake and manual master cylinders, piston means in said control cylinder, means for positioning said piston means in a neutral position with said brake and pedal release and said switch mechanism in its normally open position, an operative connection between said piston means and said switch mechanism to close one of said circuits or the other to control movement of fluid to and from said brake master cylinder, said piston means being movable from its neutral position to close one or the other of said circuits through differential pressure on opposite ends of said piston means.

2. An electro-hydraulic brake system as defined in claim 1 wherein a displacement chamber is provided in the hydraulic connection with the brake pedal side of said piston means, and a displaceable wall in said displacement chamber having an increasing resistance to displacement.

3. An electro-hydraulic brake system as defined in claim 1 wherein means are provided to hold said brake pedal in a brake applied position with said piston means in a neutral position with said brake applied.

4. An electro-hydraulic brake system as defined in claim 1 wherein a displacement chamber is provided in said hydraulic connection with said brake pedal side of said piston means, a displaceable wall in said chamber having increasing resistance to displacement, means to hold said brake pedal in a brake applied position with said piston means in a neutral position and said brake applied.

CHARLES HOLLERITH.